(12) United States Patent
Lutjen et al.

(10) Patent No.: US 10,895,167 B2
(45) Date of Patent: Jan. 19, 2021

(54) METERING HOLE GEOMETRY FOR COOLING HOLES IN GAS TURBINE ENGINE

(71) Applicant: United Technologies Corporation, Farmington, CT (US)

(72) Inventors: Paul M. Lutjen, Kennebunkport, ME (US); Christopher W. Strock, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 187 days.

(21) Appl. No.: 15/608,028

(22) Filed: May 30, 2017

(65) Prior Publication Data

US 2018/0347396 A1  Dec. 6, 2018

(51) Int. Cl.
| | | |
|---|---|---|
| *F01D 25/12* | (2006.01) | |
| *F02C 7/055* | (2006.01) | |
| *F02C 3/14* | (2006.01) | |

(52) U.S. Cl.
CPC .............. *F01D 25/12* (2013.01); *F02C 7/055* (2013.01); *F02C 3/14* (2013.01); *F05D 2260/201* (2013.01); *F05D 2260/607* (2013.01)

(58) Field of Classification Search
CPC ........ F01D 25/12; F01D 25/14; F01D 25/145; F01D 11/08; F05D 2240/11
USPC ..... 415/173.1, 115, 116, 209.2, 209.3, 209.4
See application file for complete search history.

(56) References Cited

U.S. PATENT DOCUMENTS

| | | | | |
|---|---|---|---|---|
| 4,187,054 A | * | 2/1980 | Landis, Jr. ................ | F01D 5/18 415/115 |
| 9,382,811 B2 | | 7/2016 | Harding | |
| 2005/0002779 A1 | * | 1/2005 | Tanaka .................... | F01D 5/225 415/173.1 |
| 2006/0127212 A1 | | 6/2006 | Durocher et al. | |
| 2006/0133922 A1 | * | 6/2006 | Heyward ................ | F01D 9/042 415/115 |
| 2007/0231123 A1 | * | 10/2007 | Dervaux ................... | F01D 9/06 415/115 |
| 2008/0050230 A1 | * | 2/2008 | Khanin ................... | F01D 9/042 415/209.3 |
| 2008/0131263 A1 | | 6/2008 | Lee et al. | |
| 2009/0129917 A1 | * | 5/2009 | Hazevis ................ | F01D 11/005 415/173.1 |

(Continued)

FOREIGN PATENT DOCUMENTS

WO   2016099662   6/2016

OTHER PUBLICATIONS

European Patent Office, European Search Report dated Aug. 30, 2018 in Application No. 18174050.7-1006.

(Continued)

*Primary Examiner* — Ninh H. Nguyen
*Assistant Examiner* — Aye S Htay
(74) *Attorney, Agent, or Firm* — Snell & Wilmer L.L.P.

(57) ABSTRACT

A turbine may include a blade coupled to a rotor, a vane upstream from the blade and coupled to a vane support that defines a metering hole, and a blade outer air seal disposed radially outward from the blade and downstream from the vane support. An impingement surface may be disposed between the vane support and the blade outer air seal. The impingement surface may be oriented at an angle to the metering hole of between 50 degrees and 5 degrees.

10 Claims, 4 Drawing Sheets

(56) References Cited

U.S. PATENT DOCUMENTS

| | | | |
|---|---|---|---|
| 2009/0169361 A1* | 7/2009 | Cole | F01D 5/082 |
| | | | 415/115 |
| 2016/0108748 A1* | 4/2016 | Harris | F01D 9/042 |
| | | | 415/177 |
| 2016/0333735 A1 | 11/2016 | Bunker | |
| 2017/0101932 A1 | 4/2017 | Stover et al. | |

OTHER PUBLICATIONS

European Patent Office, European Office Action dated Oct. 7, 2019 in Application No. 18174050.7.

* cited by examiner

METERING HOLE GEOMETRY FOR COOLING HOLES IN GAS TURBINE ENGINE

FIELD

The disclosure relates generally to metering hole geometry for limiting cooling hole blockage.

BACKGROUND

The high combustion temperatures of modern gas turbine engines are attainable only with proper cooling. The cooling prevents various modes of thermal distress and otherwise maintains strength of engine components. Cooling is often performed by compressed air that is a bleed off the outer diameter of the high pressure compressor. Compressed air for cooling may also be bypassed around the combustor.

The cooling air may contain contaminant particles ingested from the environment. Contaminant particles may also result from rub of abradable coatings or other particles liberated from various engine components. Those particles may form a buildup on surfaces of engine components. Buildup is particularly common where cooling air containing particles flows through an opening and impinges cooling flow onto a surface at a perpendicular angle. The particles may form a buildup deposit if softened by temperature or broken down to a very fine diameter. This buildup may impede cooling by covering a surface and blocking flow where it is deposited.

SUMMARY

A metering assembly for a gas turbine engine is disclosed herein. The metering assembly may comprise a wall defining a metering hole that ejects a jet of coolant. An impingement structure downstream from the wall may obstruct the jet of coolant from the metering hole. The jet of coolant may impinge on an impingement surface at an angle of 45 degrees or less.

In various embodiments, the angle may be 35 degrees or less. The metering hole may have an aspect ratio of 5, for example, though other aspect ratios may also be used. The metering feature and impinged surface of the present disclosure may also be on any component in the secondary flow system (i.e., locations other than the core flowpath) in various embodiments. For example, the metering hole may be formed in the wall of a vane support, and the impingement structure may be formed on the blade outer air seal (BOAS) or BOAS Support or other components within the secondary flow system.

A turbine may include a blade coupled to a rotor, a vane upstream from the blade and coupled to a vane support that defines a metering hole, and a blade outer air seal disposed radially outward from the blade and downstream from the vane support. An impingement surface may be disposed between the vane support and the blade outer air seal. The impingement surface may be oriented at an angle to the metering hole of between 50 degrees and 5 degrees.

In various embodiments, the angle may be 45 degrees or less, or 35 degrees or less. The impingement surface may be formed on the vane and/or the blade outer air seal. The metering hole may eject a jet of coolant that impinges on the impingement surface at the angle. The metering hole may have an aspect ratio of at least 2, for example, though other aspect ratios may also be used.

A gas turbine engine is also disclosed herein. The gas turbine engine may include a compressor section configured to compress a gas. Coolant may be bled from the compressor section. A combustor may be downstream from the turbine section to combust the compressed gas. A turbine section downstream from the combustor may expand the combusted gas. The turbine section may include a vane support defining a metering hole. The metering hole may eject the coolant in a jet. An impingement surface disposed downstream from the metering hole may be oriented at an angle to the metering hole of 55 degrees or less.

In various embodiments, the angle may be 45 degrees or less. A blade outer air seal may be disposed downstream from the vane with the impingement surface formed on the vane and/or the blade outer air seal. The metering hole may eject a jet of coolant that impinges on the impingement surface at the angle. The metering hole may have an aspect ratio of at least 2.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
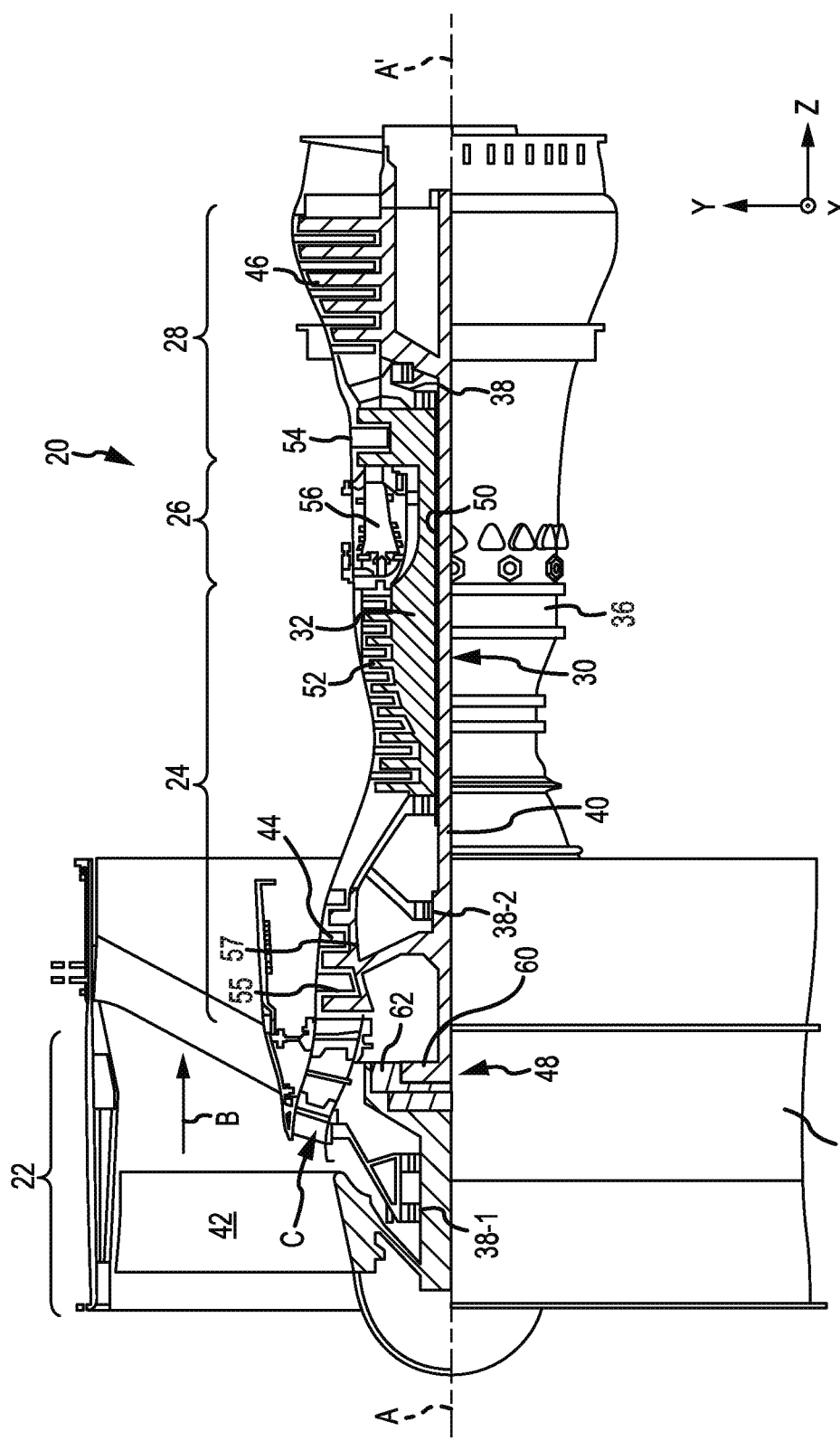
FIG. 1 illustrates an exemplary gas turbine engine according to various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass-flow path B while compressor section 24 can drive coolant along a core-flow path C for compression and communication into combustor section 26 then expansion through turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly enclosed within a gear housing that couples inner shaft 40 to a rotating fan structure. High speed spool 32 may comprise an outer shaft 50 that interconnects a high-pressure compressor 52 and high-pressure turbine 54. Airfoils 55 (e.g., blades) coupled to a rotor of high-pressure turbine may rotate about the engine central longitudinal axis A-A' or airfoils 55 (e.g., vanes) coupled to a stator may be rotationally fixed about engine central longitudinal axis A-A'. Airfoils 55 (e.g., vanes) coupled to a stator may be held in place by inner shroud 57.

A combustor 56 may be located between high-pressure compressor 52 and high-pressure turbine 54. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Coolant may be bled from high-pressure compressor 52 and/or low-pressure compressor 44 and directed to the turbines 46, 54 for cooling. Turbines 46, 54 rotationally drive the respective low speed spool 30 and high speed spool 32 in response to the expansion.

Figure 2:
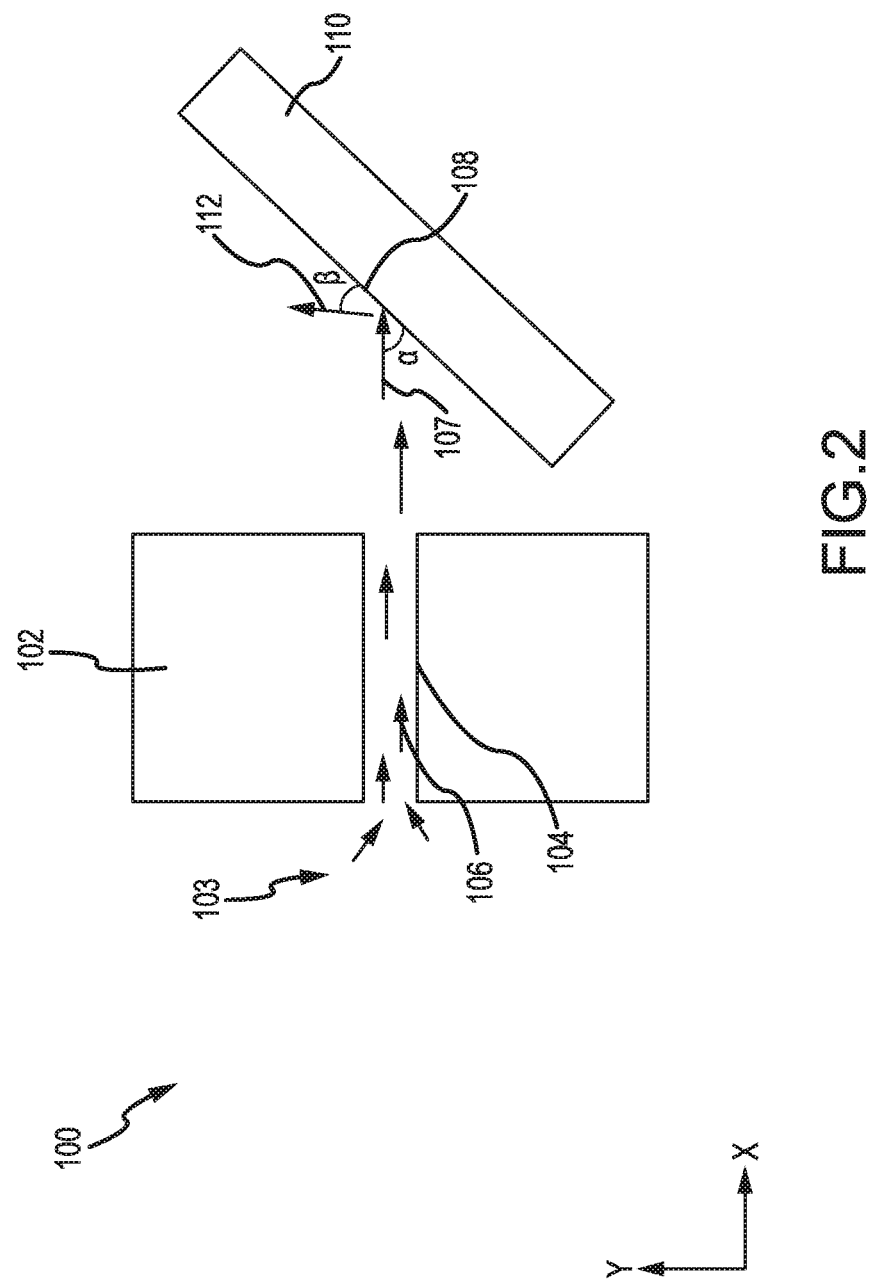
FIG. 2 illustrates an impingement flow oriented at an angle, in accordance with various embodiments.

With reference to FIG. 2, an exemplary metering assembly 100 is shown, in accordance with various embodiments. Metering assembly 100 may comprise a metering hole 104 passing through a wall 102. Metering hole 104 may have an aspect ratio of 5 (i.e., 5:1) with a length in the x direction 5 times the diameter in the y direction. Metering hole 104 may also have an aspect ratio of 0.5, 1, 2, 4, or 10, for example. Metering hole 104 may have a cylindrical geometry with a circular cross section. The particle beam contained within jet 107 of coolant 106 may remain substantially collimated and high velocity due to the metering hole 104 maintaining an aspect ratio of about 5, for example. Metering hole may limit the flow of coolant from high pressure side 103. Coolant 106 may enter metering hole 104 and exit metering hole 104 as a jet.

In various embodiments, jet 107 may impinge on impingement surface 108 of impingement structure 110 and an angle α of incidence. In various embodiments, impingement structure 110 may comprise a blade outer air seal. In various embodiments, impingement structure 110 may comprise a blade outer air seal support. Angle α may be selected to reduce buildup of particulate and reduce the angle of incidence to be less than 90 degrees. Angle α may be, for example, substantially 55 degrees, 50 degrees, 45 degrees, 40 degrees, 35 degrees, 30 degrees, 25 degrees, or another suitable angle. The term substantially is used herein to describe angles ranging by +/−2.5 degrees. Angle α may thus range from 5 degrees to 50 degrees, from 10 degrees to 45 degrees, or from 15 degrees to 35 degrees, for example. Impingement surface 108 is depicted as flat, however other surface contours such as radial, multi-radial, irregular, polygonal, spherical, or triangular, for example, may be used provided that jet 107 impinges on impingement surface 108 at angle α.

In various embodiments, deflected flow 112 may redirect from impingement surface 108 at angle β. Angle β may be, for example, substantially 55 degrees, 50 degrees, 45 degrees, 40 degrees, 35 degrees, 30 degrees, 25 degrees, or any other suitable angle. Angle β may thus range from 5 degrees to 50 degrees, from 10 degrees to 45 degrees, or from 15 degrees to 35 degrees. Deflected flow 112 may retain some or all of the particulate introduced into coolant 106 reducing particulate buildup on impingement surface 108 compared with impingement upon a surface with an impingement angle close to perpendicular. At shallow incidence angles, the particulates will be substantially retained in the deflected jet. Metering hole 104 and the downstream located impingement surface 108 thus have an angled relationship that prevents buildup of particulate material. Particulate tends to cause buildup in response to an impingement jet contacting a surface at a normal angle. If particulate is retained in the flow and not deposited then the particulate typically does not result in buildup.

In various embodiments, the reduction of the angle of incidence tends to favor deflection of particulate over formation of a deposit. High velocity particles impinging at an oblique angle α tend to bounce off and/or erode any deposited particles before a substantial buildup occurs. The low angle results in lower impingement contact pressure and a reduced tendency to deposit. Additionally, any deposit is over a larger area, less well bonded together and more prone to self-erosion by subsequent particles.

Figure 3:
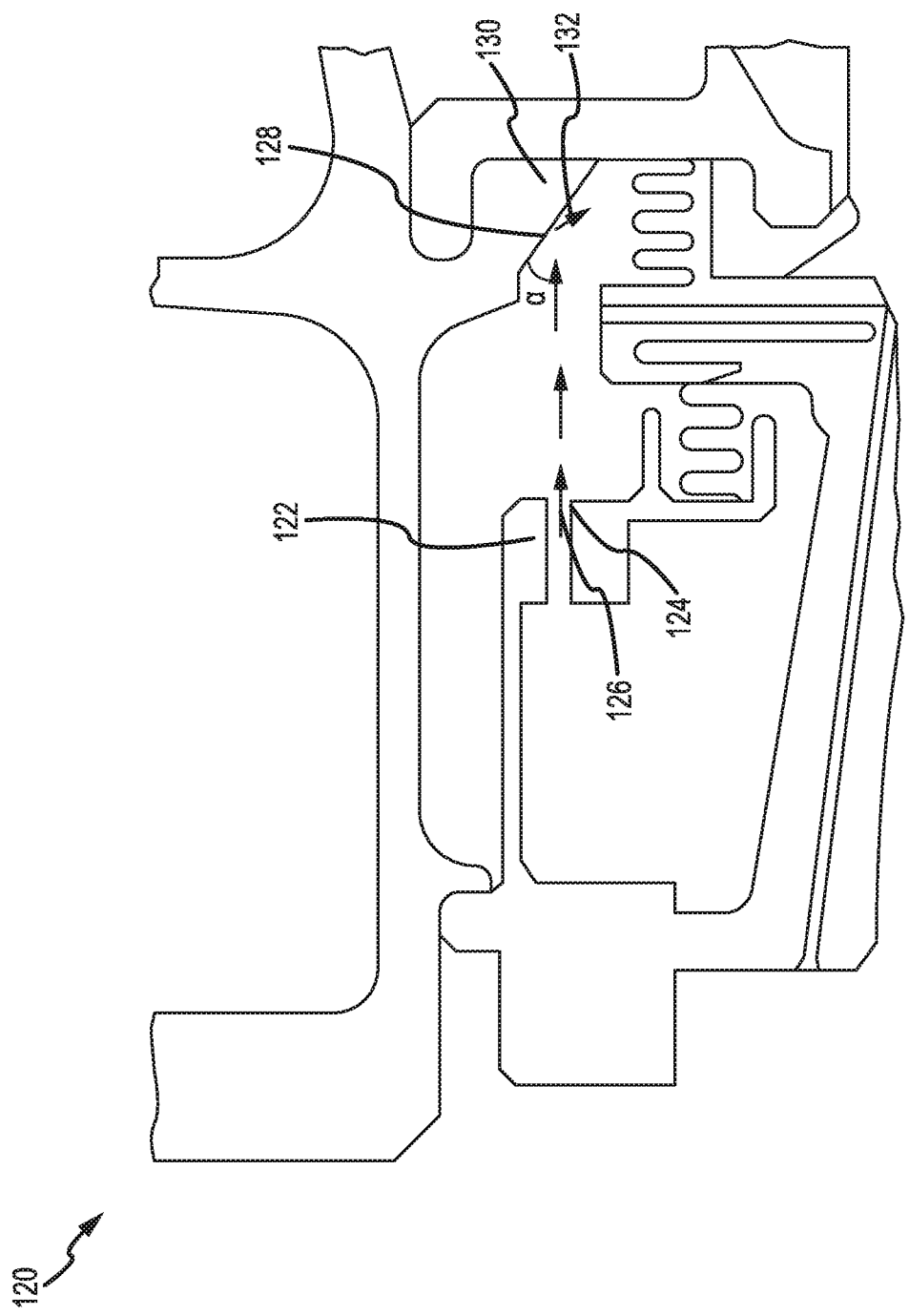
FIG. 3 illustrates an engine component having an angled impingement surface formed in a different structure than an upstream metering hole, in accordance with various embodiments.

With reference to FIG. 3, a metering assembly 120 is shown according to various embodiments. Metering assembly 120 may be located in a high-pressure turbine 54 and low-pressure turbine 46 as shown in FIG. 1 between a blade outer air seal and vane. Metering assembly 120 operates in the same manner as metering assembly 100 of FIG. 2 using an angled relationship between metering hole 124 and surface 128. Metering assembly 120 may include a vane support 122 defining metering hole 124. Metering hole 124 may extend through a wall of vane support 122. Metering hole 124 directs a jet of coolant 126 carrying particulate against surface 128 of case 130 and/or a vane support.

In various embodiments, the jet of coolant 126 impinges on surface 128 of case 130 and/or a vane support at angle α. Deflected coolant 132 may deflect from surface 128 at an angle to reduce deposition of particulate on surface 128. Metering hole 124 is illustrated as formed in vane support 122 with surface 128 disposed on case 130 and/or a vane support for exemplary purposes, and metering hole 124 may also be formed through a case 130 and/or a vane support to project a jet onto a blade outer air seal assembly downstream from case 130 and/or a vane support.

Figure 4:
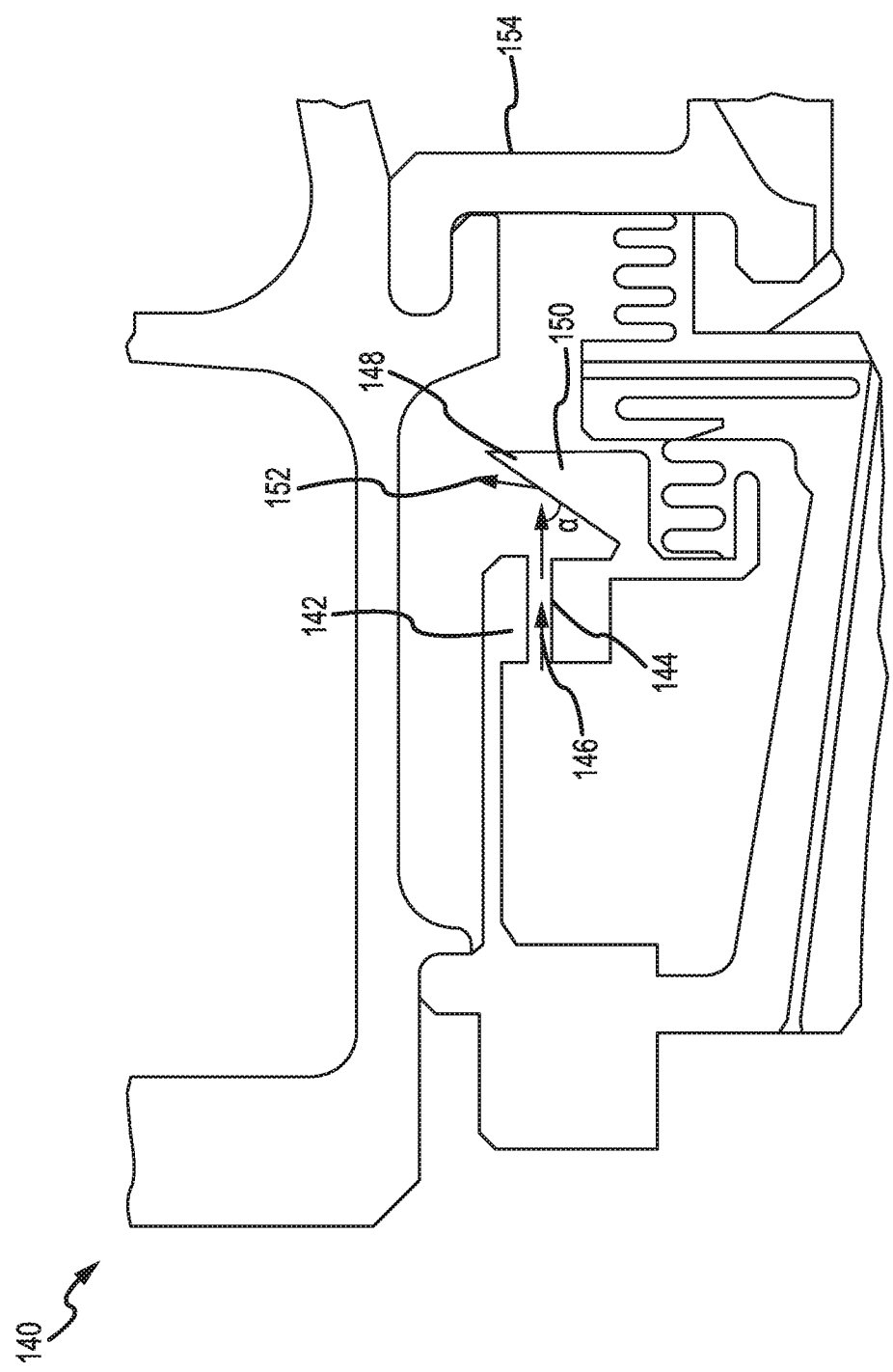
FIG. 4 illustrates an engine component having an angled impingement surface downstream from a metering hole formed in the same structure, in accordance with various embodiments.

With reference to FIG. 4, a metering assembly 140 is shown according to various embodiments. Metering assembly 140 may be located in a high-pressure turbine 54 and low-pressure turbine 46 as shown in FIG. 1 between a blade outer air seal assembly and/or a vane assembly. Metering assembly 140 operates in the same manner as metering assembly 100 of FIG. 2 using an angled relationship between metering hole 144 and surface 148. Metering assembly 140 may include a vane support 142 defining metering hole 144. Metering hole 144 may extend through a wall of vane support 142. Metering hole 144 directs a jet of coolant 146 carrying particulate against surface 148 of impingement structure 150 formed as an extension of vane support 142. Impingement structure 150 may thus redirect the jet of coolant 146 as the coolant flows towards blade outer air seal support 154 downstream from vane support 142. As depicted in FIG. 4, impingement structure 150 may be an extension of a vane support. As depicted in FIG. 4, the impingement surface 148 may be forward of a forwardmost end of the BOAS supported by blade outer air seal support 154.

In various embodiments, the jet of coolant 146 impinges on surface 148 of impingement structure 150 at angle α. Deflected coolant 152 may deflect from surface 148 at an angle to reduce deposition of particulate on surface 148. Metering hole 144 is illustrated as formed in vane support 142 with surface 148 also disposed on vane support 142 for exemplary purposes, and metering hole 144 may also be formed through a blade outer air seal support 154 to project a jet onto an impingement structure formed on blade outer air seal support 154 or a downstream vane support, for example. Although the metering holes and impingement surfaces are described herein predominantly with reference to support structures for blade outer air seals and vanes, the metering holes and impingement surfaces may be used at any location where metering is used in a gas turbine engine.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metering assembly in a turbine section of a gas turbine engine, the metering assembly comprising:
   a vane;
   a vane support radially outward of the vane and configured to secure the vane to a case;
   a wall of the vane support defining a metering hole configured to eject a jet of coolant, wherein the metering hole is configured to eject the jet of coolant at a first angle normal to a downstream surface of the wall;
   an impingement structure disposed downstream from the wall and configured to obstruct the jet of coolant from the metering hole, wherein the impingement structure is an extension of the vane support, and wherein the impingement structure is configured such that the jet of coolant contacts an impingement surface of the impingement structure at a second angle between 45 degrees and 10 degrees relative to the impingement surface; and
   a blade outer air seal disposed downstream from the vane support, wherein the impingement surface of the impingement structure is forward of a forwardmost end of the blade outer air seal.

2. The metering assembly of claim 1, wherein the second angle is between 35 degrees and 10 degrees relative to the impingement surface.

3. The metering assembly of claim 1, wherein the metering hole has an aspect ratio of at least 2:1, wherein the aspect ratio is a ratio of a length of the metering hole to a diameter of the metering hole.

4. A turbine, comprising: a blade coupled to a rotor; a vane upstream from the blade; a vane support coupled to the vane, wherein the vane support defines a metering hole configured to eject a jet of coolant at a first angle normal to a downstream surface of the vane support; a blade outer air seal disposed radially outward from the blade and downstream from the vane support; a case coupled to the vane support and the blade outer air seal; and an impingement surface disposed downstream of the metering hole, wherein the impingement surface is formed by the case, and wherein the impingement surface is oriented such that the jet of coolant contacts the impingement surface at a second angle of between 50 degrees and 5 degrees relative to the impingement surface, and wherein the impingement surface is forward of a forward most end of the blade outer air seal.

5. The turbine of claim 4, wherein the second angle is between 45 degrees and 10 degrees.

6. The turbine of claim 4, wherein the second angle is between 35 degrees and 15 degrees.

7. The turbine of claim 4, wherein the metering hole has an aspect ratio of at least 2:1, wherein the aspect ratio is a ratio of a length of the metering hole to a diameter of the metering hole.

8. A gas turbine engine comprising:
   a compressor section configured to compress a gas, wherein a coolant is bled from the compressor section;
   a combustor downstream from the compressor section;
   a turbine section downstream from the combustor, the turbine section comprising:
      a vane support defining a metering hole configured to eject a jet of the coolant at a first angle normal to a downstream surface of the vane support;
      an impingement surface disposed downstream from the metering hole, wherein the impingement surface is formed by at least one of an extension of the vane support or a case in the turbine section, and wherein the impingement surface is configured such that the jet of the coolant contacts the impingement surface at a second angle of between 50 degrees and 5 degrees relative to the impingement surface; and
      a blade outer air seal downstream from the vane support, and wherein the impingement surface is forward of a forwardmost end of the blade outer air seal.

9. The gas turbine engine of claim 8, wherein the second angle is between 45 degrees and 10 degrees.

10. The gas turbine engine of claim 8, wherein the metering hole has an aspect ratio of at least 2:1, wherein the aspect ratio is a ratio of a length of the metering hole to a diameter of the metering hole.

\* \* \* \* \*